United States Patent
Cronin

[15] 3,696,102
[45] Oct. 3, 1972

[54] PROCESS FOR THE SYNTHESIS OF SUBSTITUTED QUINAZOLIN-4-ONES

[72] Inventor: Timothy H. Cronin, Niantic, Conn.

[73] Assignee: Chas. Pfizer & Co., Inc. New York, N.Y.

[22] Filed: March 9, 1970

[21] Appl. No.: 17,948

[52] U.S. Cl......260/251 QA, 260/239 A, 260/239 B, 260/239 E, 260/256.4 Q, 260/256.5 R, 260/293.73, 260/293.77, 260/293.79, 260/293.83, 260/293.84, 260/326.82, 260/326.85
[51] Int. Cl..............................................C07d 51/48
[58] Field of Search...260/251 QA, 256.4 Q, 256.5 R

[56] References Cited

UNITED STATES PATENTS 3,047,462   7/1962   Maillard et al. ............ 167/65

Primary Examiner—Alex Mazel
Assistant Examiner—R. V. Rush
Attorney—Connolly & Hutz

[57] ABSTRACT

A process for the preparation of a substituted quinazolin-4-one compound which comprises the following two reaction steps:

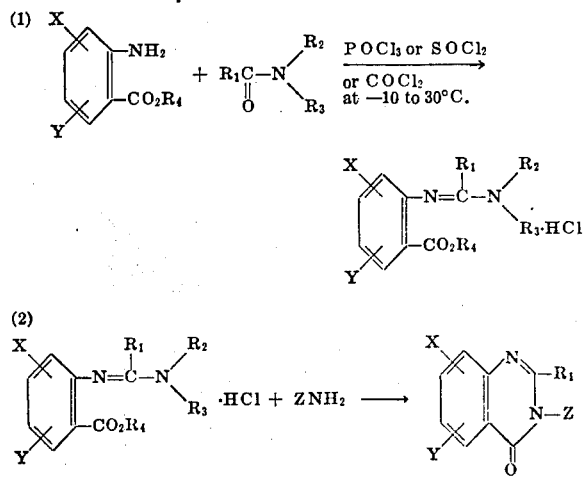

3 Claims, No Drawings

PROCESS FOR THE SYNTHESIS OF SUBSTITUTED QUINAZOLIN-4-ONES

BACKGROUND OF THE INVENTION

The process presents a method of preparing substituted quinazolin-4-ones which are valuable intermediates in the preparation of substituted quinazoline anti-hypertensive and bronchodilator agents as disclosed in U.S. Patent application Ser. No. 678,191, filed on Oct. 26, 1967, now U.S. Pat. No. 3,517,005.

SUMMARY OF THE INVENTION

The present invention contemplates a process for the preparation of a substituted quinazolin-4-one compound (V) which comprises the steps:

A. reacting a compound selected from the group consisting of $POCl_3$, $SOCl_2$, and $COCl_2$, with a substituted anthranilic ester (I) and an N,N-disubstituted amide (II), while maintaining the temperature between about $-10°$ and $30°$ C., and

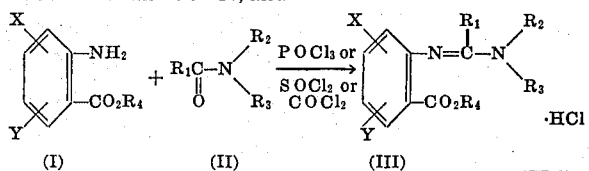

B. reacting the resulting product with substituted amine (IV) in a reaction-inert solvent at a temperature of about $0°$ to $100°$ C., and recovering said substituted quinazolin-4-one compound (V);

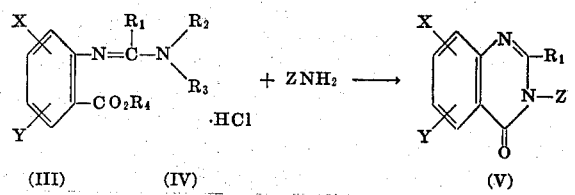

X and Y are each selected from the group consisting of H, —R, —Ar Br, Cl, F, I, $NO_2$, —C(O)R, —C(O)OR, —OR, —C(O)N(R)(R'), —N(R)C(R')O, —$S(O)_2N(R)(R'\Sigma)$, and when X and Y are taken together may be —$O(CH_2)_nO$— wherein n is an integer from 1 to 4 and —CH=CH—CH=CH—;

Z is selected from the group consisting of H, —R, OH, —OR, —N(R)(R'), —N(H)C(O)OR, —N(H)C(O)N(R)(R'), —N(R)(Ar) and —$(CH_2)_kW$, wherein k is an integer from 2 to 5 and W is selected from the group consisting of —N(R)(R'), —N(R)(Ar), OH, —OR, CN, —C(O)OR, and —C(O)N(R)(R');

$R_4$ is selected from the group consisting of —R and —Ar, except that $R_4$ is not H;

$R_2$ and $R_3$ are each —R, except that $R_2$ and $R_3$ are each never H, or taken together may be —$(CH_2)_j$— wherein j is an integer from 2 to 8;

$R_1$ is selected from the group consisting of H, lower alkyl, alkenyl, alkyl substituted with an —Ar substitutent, and cycloalkyl, said lower alkyl and alkenyl having from 1 to 4 carbon atoms and cycloalkyl having from three to four carbon atoms;

R and R' are each H or lowe alkyl;

Ar is selected from the group consisting of phenyl, phenyl-substituted lower alkyl, thienyl, pyridyl, furyl, and naphthyl.

DETAILED DESCRIPTION OF THE INVENTION

According to the invention, the conversion of I to III where $R_1$ is H is preferably carried out by adding a solution of I in dimethylformamide to the preformed complex formed between 1 equivalent of phosphorous oxychloride (or thionyl chloride or phosgene) and an excess of dimethylformamide, maintaining the temperature between $-10°$ to $30°$ C. In those cases where $R_1$ is alkyl, it is preferable to add an excess of phosphorous oxychloride (or thionyl chloride or phosgene) to a solution of I in excess N,N-disubstituted amide at $-10°$ to $30°$ C. In either case, although it is most convenient to use the desired N,N-disubstituted amide as solvent, only 1 to 5 equivalents are necessary and other non-hydroxylic solvents could be utilized such as but not limited to methylene chloride, ethylene chloride, chloroform, carbon tetrachloride, benzene, and ether.

In practice, the conversion of III to V is preferably carried out in two fashions: 1) if III is not isolated, the solution (or suspension) containing this species is added to a solution of excess amine component ($ZNH_2$) in a reaction-inert solvent, preferably ethanol or water, at $0°$ to $100°$ C. and the product is isolated by filtration or extraction; 2) if the intermediate III is isolated it is usually necessary to use only 2 equivalents of the amine component in a reaction-inert solvent, by filtration or extraction.

The choice of a reaction-inert solvent in step B is not critical to the reaction. The reaction-inert solvent does not partake in the reaction and has no adverse effects on the reactants and products. Typical examples of these solvents are water, ethanol, methanol, and propanol.

Temperature control is, of course, important. In step A it is preferable to maintain the temperature between about $-10°$ to $30°$ C., as in any reaction that readily occurs, to prevent or minimize side reactions and to stabilize some of the preformed complexes between II and $POCl_3$ (or $SOCl_2$ or $COCl_2$). In step B it is preferable to maintain the temperature between about $0°$ to $100°$ C. due to convenience and minimization of undesirable side reactions. In step A it is preferable to use at least 1 equivalent of $POCl_3$, $SOCl_2$, or $COCl_2$ to obtain good yields of product. Furthermore, it is preferable to use between 1 to 5 equivalents of the N,N-disubstituted amide. Preferably, more than 1 equivalent of the amide is used, the excess up to 5 equivalents acting as a solvent for I and $POCl_3$, $SOCl_2$, or $COCl_2$. More than 5 equivalents of amide can be used, but this does not alter the yield of III appreciably and only results in additional costs due to the use of excess amide.

In step B it is preferable to use about 2 equivalents of substituted amine. Use of less than this amount could possibly result in poorer yields.

Although any pressure can be used in the process, it is preferable and most convenient to use atmospheric pressure.

The following examples are provided for illustrative purposes and should not be interpreted as limiting the invention, the scope of which is defined by the appended claims. All temperatures are given in ° C. unless otherwise indicated.

EXAMPLE I

Preparation of the Formamidinium Salt (5).

To 150 ml. of cold (0° C.) dimethylformamide was added 21.8 g. (0.142 mole) of phosphorous oxychloride dropwise over 5 min., followed by dropwise addition of a solution of 30.0 g. (0.142 mole) of methyl 4,5-dimethoxyanthranilate (4) in 150 ml. of dimethylformamide over a 30 min. period. The temperature was maintained below 10° C. The resulting white slurry was allowed to warm to room temperature while stirring, and then chilled to 5° C. and filtered. The solid was washed with 100 ml. of cold ethanol and finally with 200 ml. of ether and oven dried to give 41.8 g. (98 percent) of white microcrystalline solid, m.p. 204°–204.5°. The analytical sample was prepared by recrystallization of a 2 g. sample from ethanol to give 1.58 g. of material with m.p. 206°.

Anal. Calc'd. for $C_{13}H_{19}ClN_2O_4$: C, 51.20; H, 6.32; N, 9.22; Cl, 11.70.

Found: C, 51.19; H, 6.43; N, 9.11. Cl, 11.69.

EXAMPLE II

Preparation of the Formamidinium Salt (5.

To 5 ml. of cold (0°) dimethylformamide was added 0.59 g. (5 mmoles of thionyl chloride followed by dropwise addition of a solution of 1.05 g. (5 mmoles) of methyl 4,5-dimethoxyanthranilate in 15 ml. of dimethylformamide. The resulting white suspension was allowed to warm to room temperature and filtered. The solid was washed with ethanol and finally with ether and dried to give 0.950 g. (63 percent) of white microcrystalline solid, m.p. 204°–206° identical with the material prepared using phosphorous oxychloride. The formamidinium salt (5) is similarly prepared using phosgene instead of thionyl chloride.

EXAMPLE III 6,7-Dimethoxy-4(3H)-quinazolinone (6) without isolation of (5).

To a cold solution of 700 ml. of dimethylformamide was added 153.4 g. (1.0 mole) of phosphorous oxychloride dropwise over 15 min. To the resulting mechanically stirred solution was added a solution of 211.2 g. (1.0 mole) of methyl 4,5-dimethoxyanthranilate (4) in 800 ml. of dimethylformamide dropwise over 1 hr. maintaining the temperature at 10° C. The salt began to precipitate after 12 min. The resulting suspension was allowed to warm to room temperature and poured slowly into 2 l. of well-stirred conc. ammonium hydroxide solution. During the addition the temperature rose to 45° C. The resulting mixture was cooled to 0° C. and filtered. The solid was washed with 1.5 l. of water and finally dried over phosphorous pentoxide to give 200 g. (97 percent) of (6) as a white microcrystalline solid, m.p. 284°–286° identical with an authentic sample.

EXAMPLE IV

2-Methyl-6,7-dimethoxy-4(3H)-quinazolinone (7).

To a cold (0° C.) solution of 1.05 g. (5 mmoles) of methyl 4,5-dimethoxyanthranilate (4) in 5 ml. of N,N-dimethylacetamide was added dropwise 2.295 g. (15 mmoles) of phosphorous oxychloride and the reaction mixture allowed to warm to room temperature. After 30 min. the mixture solidified, and was added to 25 ml. of conc. ammonium hydroxide solution. The resulting

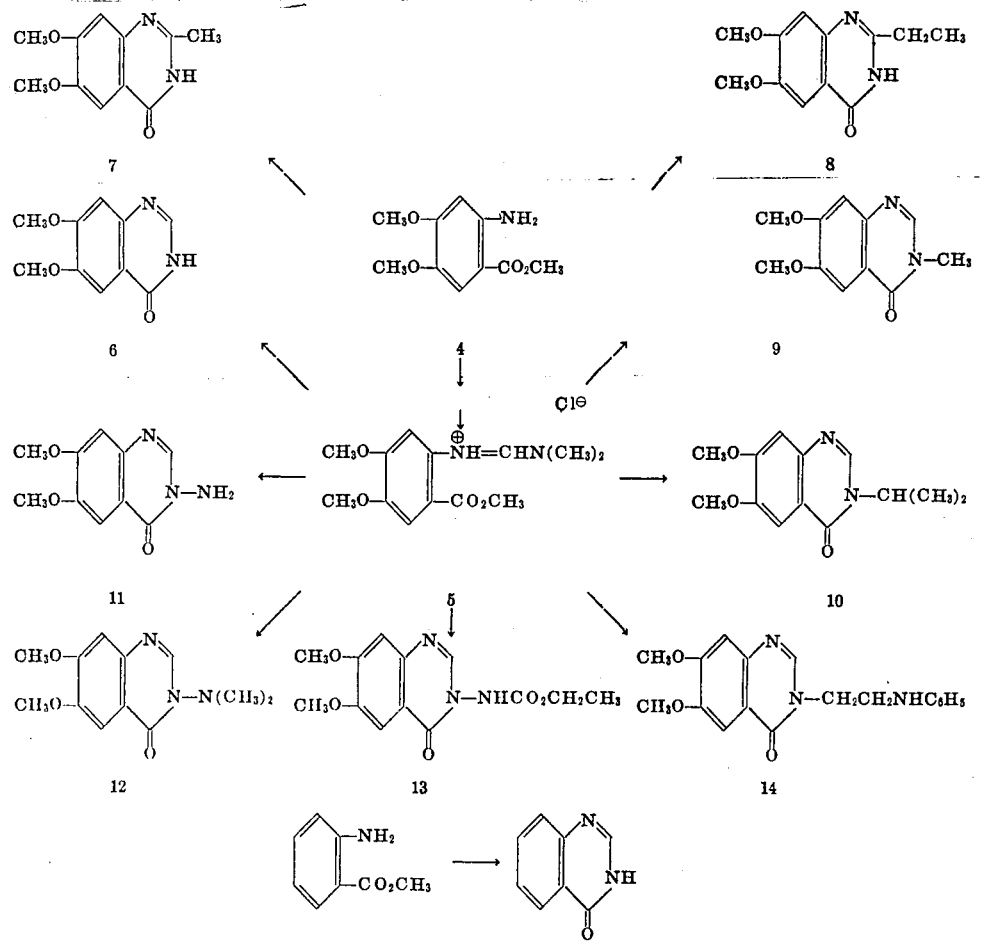

solution was cooled in an ice-bath and the pH adjusted to 5.0 with conc. hydrochloric acid solution. The resulting solid was filtered, washed with water and air dried to give 0.63 (57 percent) of (7) as white needles, m.p. 297°–298° identical with an authentic sample.

EXAMPLE V

2-Ethyl-6,7-dimethoxy-4(3H)-quinazoline (8).

To a cold (0° C.) suspension of 1.05 g. (5 mmoles) of methyl 4,5-dimethoxyanthranilate (4) in 5 ml. N,N-dimethylpropionamide was added dropwise 2.3 g. (15 mmoles) of phosphorous oxychloride. There was a complete purple solution when the addition was half-completed. After warming to room temperature the solution became yellow and was poured slowly into 40 ml. of conc. ammonium hydroxide solution. The resulting solution was chilled and the pH adjusted to 5.0 with conc. hydrochloric acid solution. The solid was filtered, washed with water and ethanol and air dried to give 0.54 g. (46 percent) of white microcrystalline solid m.p. 252°–253°, identical with an authentic sample.

EXAMPLE VI

3-Methyl-6,7-dimethoxyquinazolin-4-one (9).

To a slurry of 3.0 g. (10 mmoles) of (5) in 50 ml. of ethanol was passed a stream of gaseous methylamine for 10 min. There was a partial solution after 5 min. followed by a heavy precipitation. The mixture was chilled to 5° and filtered to give 1.24 g. (56 percent) of white microcrystalline solid, m.p. 211°–212°. An additional 0.76 g. (35 percent) of material m.p. 210°–212° was obtained by concentration of the mother liquor. The combined solids (2.0 g., 91 percent) were recrystallized from ethyl acetate to provide 1.1 g. of (9) as white needles, m.p. 211°–212°.

Anal. Calc'd for $C_{11}H_{12}N_2O_3$: C, 59.99; H, 5.49; N, 12.72.

Found: C, 59.77; H, 5.61; N, 12.75.

EXAMPLE VII

3-Isopropyl-6,7-dimethoxyquinazolin-4-one (10).

To a slurry of 3.0 g. (10 mmoles) of (5) in 50 ml. of ethanol was added 1.18 g. (20 mmoles) of isopropylamine. There was a complete solution in 15 min. followed by a precipitation after 40 min. After stirring for a total of one hour at room temperature the solvent was removed by evaporation and the residue recrystallized from ethyl acetate-hexane mixture to give 1.5 g. (60 percent) of (10) as white needles, m.p. 159°–160°.

Anal. Calc'd. for $C_{13}H_{16}N_2O_3$: C, 62.89; H, 6.50; N, 11.28.

Found: C, 62.59; H, 6.64; N, 11.35.

EXAMPLE VIII

3-Amino-6,7-dimethoxyquinazolin-4-one (11).

A solution containing 1.0 g. (3.3 mmoles) of (5) and 0.33 g. (6.6 mmoles) of hydrazine hydrate in 20 ml. of water was stirred for 10 min. and filtered to give 0.72 g. (99 percent) of (11) as a white crystalline solid, m.p. 215°–216°.

Anal. Calc'd. for $C_{10}H_{11}N_3O_3$: C, 54.29; H, 5.01; N, 19.00.

Found: C, 54.56; H, 4.92; N, 19.30.

EXAMPLE IX

3-Dimethylamino-6,7-dimethoxyquinazolin-4-one (12).

A mixture containing 2.0 g. (6.6 mmoles) of (5) and 1.19 g. (19.8 mmoles) of N,N-dimethylhydrazine in 30 ml. of ethanol was heated at reflux for 30 min. The cooled solution was filtered to give 1.13 g. (67 percent) of (12) as a white microcrystalline solid, m.p. 170°–172°.

Anal. Calc'd. for $C_{12}H_{15}N_3O_3$: C, 57.82; H, 6.07; N, 16.86.

Found: C, 57.57; H, 6.10; N, 16.42.

EXAMPLE X

3-Carboethoxyamino-6,7-dimethoxyquinazolin-4-one (13).

A solution containing 1.0 g. (3.3 mmoles) of (5) and 0.680 g. (6.6 mmoles) of ethyl carbazate in 10 ml. of water was stirred at room temperature for 1 hr. and then on a steam cone for 15 min. The resulting suspension was cooled and filtered to give 0.1 g. (10 percent) of (13) as a white microcrystalline solid, m.p. 240°–241°.

Anal. Calc'd. for $C_{13}H_{15}N_3O_5$: C, 53.24; H, 5.16; N, 14.33.

Found: C, 53.07; H, 5.17; N, 14.25.

EXAMPLE XI 3-(2-Anilinoethyl)-6,7-dimethoxyquinazolin-4-one (14).

To a solution of 2.0 g. (6.6 mmoles) of (5) in 20 ml. of water was added 1.77 g. (13 mmoles) of N-phenylethylenediamine. There was a heavy precipitate after 5 min. and the mixture was stirred for a total of 20 min. and filtered. The solid was washed with water and dried to give 2.0 g. (93 percent) of white solid, m.p. 185°–192°. This was recrystallized from ethanol-methylene chloride mixture to give 1.0 g. (47 percent) of (14) as a white microcrystalline solid, m.p. 196°–197°.

Anal. Calc'd for $C_{18}H_{19}N_3O_3$: C, 66.45; H, 5.89; N, 12.91.

Found: C, 66.64; H, 6.16; N, 13.13.

EXAMPLE XII

4(3H)-Quinazolinone (16).

To 40 ml. of cold (0°C.) dimethylformamide was added 9.72 g. (0.0625 mole) of phosphorous oxychloride followed by a solution of 9.44 g. (0.0625 mole) of methyl anthranilate (15) in 15 ml. of dimethylformamide. After warming to room temperature the resulting suspension was poured into 200 ml. of conc. ammonium hydroxide solution. The solution was acidified to pH 5.0 and extracted with three 125 ml. portions of methylene chloride. The combined extracts were dried over sodium sulfate and evaporated to give 6.13 g. (68 percent) of (16) as a white crystalline solid, m.p. 214°–217°.

Anal. Calc'd. for $C_8H_6N_2O$: C, 65.75; H, 4.14; N, 19.17.

Found: C, 65.72; H, 4.14; N, 19.08.

EXAMPLE XIII

Substituted quinazolin-4-one compounds (V) are prepared by the procedures described in Examples I, IV, VI, and XII from the appropriate starting compounds and according to the following reaction sequences:

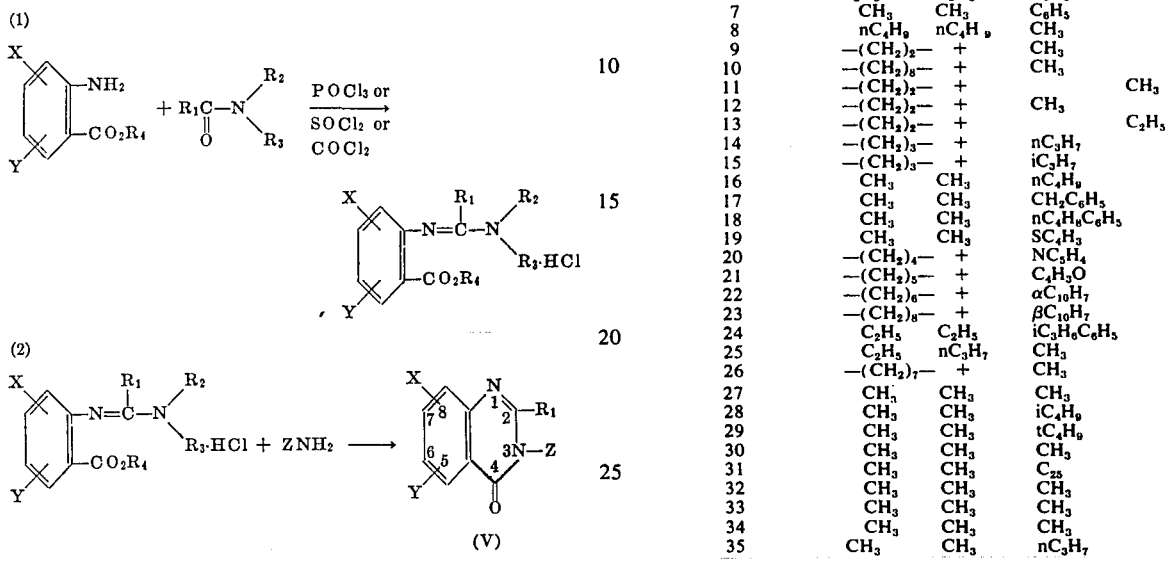

Note in the table below:
* Means the X-substituent represents X and Y taken together;
+ Means the $R_2$-substituent represents $R_2$ and $R_3$ taken together.

| Compound No. | $R_2$ | $R_3$ | $R_4$ |
|---|---|---|---|
| 1 | $CH_3$ | $CH_3$ | $CH_3$ |
| 2 | $CH_3$ | $CH_3$ | $CH_3$ |
| 3 | $iC_3H_7$ | $CH_3$ | $CH_3$ |
| 4 | $nC_3H_7$ | $nC_3H_7$ | $C_2H_5$ |
| 5 | $iC_4H_9$ | $CH_3$ | $C_2H_5$ |
| 6 | $C_2H_5$ | $C_2H_5$ | $C_6H_5$ |
| 7 | $CH_3$ | $CH_3$ | $C_6H_5$ |
| 8 | $nC_4H_9$ | $nC_4H_9$ | $CH_3$ |
| 9 | $-(CH_2)_2-$ | + | $CH_3$ |
| 10 | $-(CH_2)_3-$ | + | $CH_3$ |
| 11 | $-(CH_2)_2-$ | + | $CH_3$ |
| 12 | $-(CH_2)_2-$ | + | $CH_3$ |
| 13 | $-(CH_2)_2-$ | + | $C_2H_5$ |
| 14 | $-(CH_2)_3-$ | + | $nC_3H_7$ |
| 15 | $-(CH_2)_3-$ | + | $iC_3H_7$ |
| 16 | $CH_3$ | $CH_3$ | $nC_4H_9$ |
| 17 | $CH_3$ | $CH_3$ | $CH_2C_6H_5$ |
| 18 | $CH_3$ | $CH_3$ | $nC_4H_8C_6H_5$ |
| 19 | $CH_3$ | $CH_3$ | $SC_4H_3$ |
| 20 | $-(CH_2)_4-$ | + | $NC_5H_4$ |
| 21 | $-(CH_2)_5-$ | + | $C_4H_3O$ |
| 22 | $-(CH_2)_6-$ | + | $\alpha C_{10}H_7$ |
| 23 | $-(CH_2)_8-$ | + | $\beta C_{10}H_7$ |
| 24 | $C_2H_5$ | $C_2H_5$ | $iC_3H_6C_6H_5$ |
| 25 | $C_2H_5$ | $nC_3H_7$ | $CH_3$ |
| 26 | $-(CH_2)_7-$ | + | $CH_3$ |
| 27 | $CH_3$ | $CH_3$ | $CH_3$ |
| 28 | $CH_3$ | $CH_3$ | $iC_4H_9$ |
| 29 | $CH_3$ | $CH_3$ | $tC_4H_9$ |
| 30 | $CH_3$ | $CH_3$ | $CH_3$ |
| 31 | $CH_3$ | $CH_3$ | $C_{25}$ |
| 32 | $CH_3$ | $CH_3$ | $CH_3$ |
| 33 | $CH_3$ | $CH_3$ | $CH_3$ |
| 34 | $CH_3$ | $CH_3$ | $CH_3$ |
| 35 | $CH_3$ | $CH_3$ | $nC_3H_7$ |

| Compound No. | X | Y | Z | $R_1$ |
|---|---|---|---|---|
| 1 | H | H | H | H |
| 2 | H | 5-$S(O)_2NHC_2H_5$ | $CH_3$ | $tC_4H_9$ |
| 3 | 8-$CH_3$ | 6-$S(O)_2N(nC_4H_9)_2$ | $nC_4H_9$ | $CH_3$ |
| 4 | 6-$nC_4H_9$ | 8-$S(O)_2NH_2$ | $iC_3H_7$ | $C_2H_5$ |
| 5 | 5-$nC_3H_7$ | 7-$iC_3H_6C_6H_5$ | OH | $C_2H_5$ |
| 6 | 7-$iC_3H_7$ | 6-$iC_3H_7$ | $OnC_3H_7$ | $C_3H_5$ |
| 7 | 7-$tC_4H_9$ | 6-$CH_3$ | $OCH_3$ | $\alpha C_4H_7$ |
| 8 | 5-$CH_2C_6H_5$ | H | $NH_2$ | $\beta C_4H_7$ |
| 9 | 6-$nC_4H_8C_6H_5$ | H | $NHCH_3$ | $\gamma C_4H_7$ |
| 10 | 8-$CH_2(SC_4H_3)$ | H | $N(nC_4H_9)_2$ | $CH_2C_6H_5$ |
| 11 | 6-$nC_3H_6(NC_5H_4)$ | 8-I | $N(CH_3)(C_2H_5)$ | $C_2H_4CH_2C_6H_5$ |
| 12 | 6-$C_2H_4(\alpha C_{10}H_7)$ | 5-Cl | $N(H)C(O)OCH_3$ | $iC_4H_8(nC_4H_9)$ |
| 13 | 6-$CH_2(\beta C_{10}H_7)$ | 7-Br | $N(H)C(O)OtC_4H_9$ | $CH_2(SC_4H_3)C_2H_5$ |
| 14 | 7-$CH(C_4H_3O)C_2H_5$ | 5-F | $N(H)C(O)NH_2$ | $C_2H_4(NC_5H_4)$ |
| 15 | 8-Cl | 5-$C(O)NHCH_3$ | $N(H)C(O)NHCH_3$ | $CH_2(C_4H_3O)$ |
| 16 | 8-F | 6-$C(O)NH_2$ | $N(H)C(O)NH(nC_4H_9)$ | $nC_3H_6(\alpha C_{10}H_7)$ |
| 17 | 7-Br | 5-$C(O)N(iC_3H_7)_2$ | $N(H)C(O)N(CH_3)_2$ | $iC_3H_6(\beta C_{10}H_7)$ |
| 18 | 6-I | 5-$C(O)NH(C_2H_5)$ | $NHC_6H_5$ | $\overline{CH_2CH_2CH}$ |
| 19 | 6-$NO_2$ | 8-$nC_4H_8(NC_5H_4)$ | $N(CH_3)CH_2C_6H_5$ | $\overline{CH_2CH_2CH_2CH}$ |
| 20 | 5-$NO_2$ | 7-$CH_2(C_4H_3O)$ | $N(nC_4H_9)nC_3H_6C_6H_5$ | H |
| 21 | 5-C(O)H | 7-$C_2H_4(\alpha C_{10}H_7)$ | $NH(SC_4H_3)$ | H |
| 22 | 5-C(O)$CH_3$ | 7-$CH(\beta C_{10}H_7)CH_3$ | $NH(NC_5H_4)$ | H |
| 23 | 5-$C(O)(nC_4H_9)$ | H | $N(CH_3)(C_4H_3O)$ | H |
| 24 | 6-$C(O)(OiC_4H_9)$ | H | $NH(\alpha C_{10}H_7)$ | H |
| 25 | 6-C(O)OH | 7-$CH_2C_6H_5$ | $NH(\beta C_{10}H_7)$ | $CH_3$ |
| 26 | 7-$OCH_3$ | 6-$OCH_3$ | $(CH_2)_2NH_2$ | H |
| 27 | 8-OH | 6-$nC_3H_7(SC_4H_3)$ | $(CH_2)_2NHCH_3$ | H |
| 28 | 7-C(O)$NHCH_3$ | 5-Cl | $(CH_2)_2N(nC_4H_9)_2$ | H |
| 29 | 7-$C(O)N(CH_3)_2$ | 5-Cl | $(CH_2)_3NHC_6H_5$ | H |
| 30 | 6-$C(O)N(nC_3H_7)_2$ | 5-Cl | $(CH_2)_4NHCH_2C_6H_5$ | H |
| 31 | 6-$C(O)NH(nC_4H_9)$ | 7-OH | $(CH_2)_3N(C_2H_5)nC_4H_8C_6H_5$ | H |
| 32 | 6-$NHC(CH_3)O$ | 7-C(O)OH | $(CH_2)_3NCH_2(SC_4H_3)$ | $CH_3$ |
| 33 | 8-NHCHO | 5-$C(O)(OtC_4H_9)$ | $(CH_2)_2NH(NC_5H_4)$ | $CH_3$ |
| 34 | 7-$N(nC_4H_9)C(nC_4H_9)O$ | H | $(CH_2)_6NH(C_4H_3O)$ | $C_2H_5$ |
| 35 | 7-$S(O)_2NH_2$ | 6-C(O)$CH_3$ | $(CH_2)_3NH(\alpha C_{10}H_7)$ | $C_2H_5$ |
| 36 | 6-$S(O)_2NHCH_3$ | 7-C(O)H | $(CH_2)_8NH(\beta C_{10}H_7)$ | H |
| 37 | 6-$S(O)_2N(C_2H_5)_2$ | 8-$NO_2$ | $(CH_2)_2OH$ | H |
| 38 | 6,7-$OCH_2O-$ | (*) | $(CH_2)_2OCH_3$ | H |
| 39 | 5,7-$O(CH_2)_4O-$ | (*) | $(CH_2)_3OnC_4H_9$ | H |
| 40 | 6,7-$CH=CH-CH=C-$ | (*) | $(CH_2)_4CN$ | $nC_3H_7$ |
| 41 | H | 5-NHCHO | $(CH_2)_5C(O)OH$ | $CH_3$ |
| 42 | 7-$CH_3$ | 6-$CH_3$ | $(CH_2)_2C(O)OiC_4H_9$ | $CH_3$ |
| 43 | H | 7-$nC_4H_9$ | $(CH_2)_3C(O)OCH_3$ | $CH_3$ |
| 44 | 6-$OCH_3$ | 7-$OCH_3$ | $CH_3$ | $CH_3$ |
| 45 | 6-$OCH_3$ | 7-$OCH_3$ | $CH_3$ | H |
| 46 | 6-$OCH_3$ | 7-$OCH_3$ | $(CH_2)_2C(O)NH_2$ | H |
| 47 | H | 7-$o(nC_4H_9)$ | $(CH_2)_5C(O)NHCH_3$ | H |
| 48 | 7-$OCH_3$ | 6-$OCH_3$ | $(CH_2)_3C(O)N(C_2H_5)_2$ | H |
| 49 | H | H | $(CH_2)_4C(O)N(nC_4H_9)_2$ | H |
| 50 | 6-$CH_3$ | H | H | H |
| 51 | H | 6-$C(O)OCH_3$ | H | H |
| 52 | H | 6-$N(CH_3)C(nC_3H_7)O$ | H | H |
| 53 | 6-$OCH_3$ | 7-$OCH_3$ | $CH_3$ | $CH_3$ |
| 54 | 6-$OCH_3$ | 7-$OCH_3$ | $CH_3$ | $C_2H_5$ |
| 55 | 6-$OCH_3$ | 7-$OCH_3$ | $CH_3$ | $nC_3H_7$ |
| 56 | 6-$OCH_3$ | 7-$OCH_3$ | $CH_3$ | $nC_4H_9$ |
| 57 | 6-$OCH_3$ | 7-$OCH_3$ | $CH_3$ | |

| | | | |
|---|---|---|---|
| 36 | C₂H₅ | C₂H₅ | CH₃ |
| 37 | —(CH₂)₈— | + | CH₃ |
| 38 | —(CH₂)₈— | + | CH₃ |
| 39 | —(CH₂)₈— | + | CH₃ |
| 40 | —(CH₂)₈— | + | C₂H₅ |
| 41 | —(CH₂)₃— | + | nC₄H₉ |
| 42 | CH₃ | CH₃ | nC₃H₇ |
| 43 | CH₃ | CH₃ | C₂H₅ |
| 44 | C₂H₅ | C₂H₅ | CH₃ |
| 45 | C₂H₅ | C₂H₅ | CH₃ |
| 46 | C₂H₅ | C₂H₅ | CH₃ |
| 47 | CH₃ | CH₃ | CH₃ |
| 48 | CH₃ | CH₃ | CH₃ |
| 49 | CH₃ | CH₃ | CH₃ |
| 50 | CH₃ | CH₃ | CH₃ |
| 51 | —(CH₂)₂— | + | CH₃ |
| 52 | —(CH₂)₂— | + | CH₃ |
| 53 | CH₃ | CH₃ | CH₃ |
| 54 | CH₃ | CH₃ | CH₃ |
| 55 | CH₃ | CH₃ | CH₃ |
| 56 | CH₃ | CH₃ | CH₃ |
| 57 | CH₃ | CH₃ | CH₃ |

What is claimed is:

1. A process for the preparation of a substituted quinazolin-4-one compound (V) which comprises the steps:

A. reacting a compound selected from the group consisting of $POCl_3$, $SOCl_2$, and $COCl_2$ with a substituted anthranilic ester (I) and an N,N-disubstituted amide (II), while maintaining the temperature between about $-10°$ and $30°$ C., and

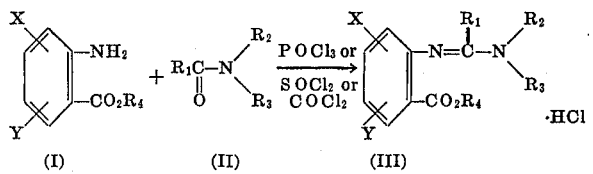

B. reacting the resulting product with substituted amine (IV) in a reaction-inert solvent at a temperature of about $0°$ to $100°$ C., and recovering said substituted quinazolin-4-one compound (V);

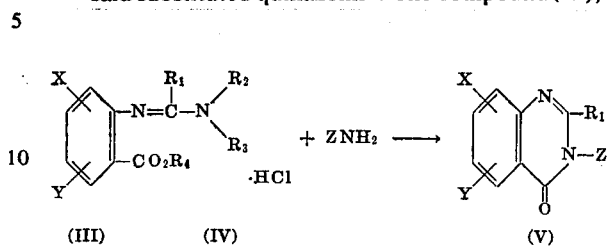

wherein

X and Y are H or OR;

Z is H, R, —N(R)(R'), —N(H)C(O)OR or —(CH₂)ₖW wherein K is an integer from 2 to 5 and W is —N(R)(R');

R₄ is lower alkyl;

R₂ and R₃ are each -R, except that R₂ and R₃ are each never H, or taken together may be —(CH₂)ⱼ— wherein j is an integer from 2 to 8;

R₁ is H or lower alkyl having 1 to 4 carbon atoms;

R and R' are each H or lower alkyl.

2. The process of claim 1 wherein X and Y are each lower alkoxy.

3. The process of claim 2 wherein Z is H.

* * * * *